(12) United States Patent
Yin (10) Patent No.: US 10,148,576 B2
(45) Date of Patent: Dec. 4, 2018

(54) NETWORK PROCESSING UNIT (NPU) INTEGRATED LAYER 2 NETWORK DEVICE FOR LAYER 3 OFFLOADING

(71) Applicant: Fortinet, Inc., Sunnyvale, CA (US)

(72) Inventor: Jun Yin, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 68 days.

(21) Appl. No.: 15/221,987

(22) Filed: Jul. 28, 2016

(65) Prior Publication Data

US 2018/0034734 A1 Feb. 1, 2018

(51) Int. Cl.
*H04L 12/803* (2013.01)
*H04L 29/06* (2006.01)
*H04L 12/851* (2013.01)

(52) U.S. Cl.
CPC ........ *H04L 47/125* (2013.01); *H04L 47/2483* (2013.01); *H04L 63/02* (2013.01); *H04L 69/22* (2013.01)

(58) Field of Classification Search
CPC ..... H04L 47/10; H04L 47/15; H04L 47/2441; H04L 12/5695; H04Q 11/0478
See application file for complete search history.

(56) References Cited

U.S. PATENT DOCUMENTS

| | | | | |
|---|---|---|---|---|
| 5,881,242 A * | 3/1999 | Ku | ........................ | H04L 45/00 709/238 |
| 7,397,797 B2 * | 7/2008 | Alfieri | .................... | H04L 29/06 370/392 |
| 7,401,355 B2 * | 7/2008 | Supnik | .................... | H04L 45/00 726/11 |
| 7,440,405 B2 * | 10/2008 | Hsieh | .................. | H04L 12/4633 370/230 |
| 7,675,920 B1 * | 3/2010 | Droux | ..................... | H04L 69/22 370/395.21 |
| 7,693,050 B2 * | 4/2010 | Achlioptas | ............ | H04L 45/745 370/229 |
| 7,764,611 B2 * | 7/2010 | Rijhsinghani | .......... | H04L 45/00 370/230 |
| 7,818,786 B2 * | 10/2010 | Yoon | ................... | H04L 63/1458 726/23 |
| 7,853,695 B2 * | 12/2010 | Kaler | ..................... | H04L 29/06 709/201 |
| 7,941,837 B1 * | 5/2011 | Jiang | ................... | H04L 63/0236 370/352 |
| 8,542,585 B2 * | 9/2013 | McDaniel | ............... | H04L 29/06 370/230 |

(Continued)

*Primary Examiner* — Mark H Rinehart
*Assistant Examiner* — Sanjay K Dewan
(74) *Attorney, Agent, or Firm* — Hamilton, DeSanctis & Cha LLP (57) ABSTRACT

Systems and methods for facilitating offloading of communication sessions from layer 3 network devices are provided. According to one embodiment, session information pertaining to a session capable of being offloaded is received from a layer 3 network device by a layer 2 network device that includes multiple network processing units (NPUs). The session is assigned to one of the NPUs. Subsequently, responsive to receiving, by the layer 2 network device, a packet associated with the session, the packet is processed by the assigned NPU and forwarded on behalf of the layer 3 network device to a destination specified by the processed packet.

13 Claims, 8 Drawing Sheets

(56) References Cited

U.S. PATENT DOCUMENTS

| | | | | |
|---|---|---|---|---|
| 8,677,010 B2* | 3/2014 | Elzur | | H04L 29/06 |
| | | | | 370/230 |
| 8,792,353 B1* | 7/2014 | Janarthanan | | H04L 47/10 |
| | | | | 370/236 |
| 9,131,070 B2* | 9/2015 | Livne | | H04M 15/64 |
| 9,722,933 B2* | 8/2017 | Janarthanan | | H04L 47/2483 |
| 9,723,155 B2* | 8/2017 | Narayanan | | H04M 15/8228 |
| 9,858,104 B2* | 1/2018 | Tripathi | | G06F 9/45558 |
| 2004/0210663 A1* | 10/2004 | Phillips | | H04L 67/1008 |
| | | | | 709/230 |
| 2006/0101159 A1* | 5/2006 | Yeh | | H04L 45/00 |
| | | | | 709/246 |
| 2009/0285091 A1* | 11/2009 | Hiscock | | H04L 12/24 |
| | | | | 370/230 |
| 2011/0075675 A1* | 3/2011 | Koodli | | H04L 12/14 |
| | | | | 370/401 |
| 2013/0007286 A1* | 1/2013 | Mehta | | H04W 76/10 |
| | | | | 709/227 |
| 2014/0153577 A1* | 6/2014 | Janakiraman | | H04L 47/122 |
| | | | | 370/392 |
| 2014/0198653 A1* | 7/2014 | Dalal | | G06F 13/16 |
| | | | | 370/235 |
| 2016/0080505 A1* | 3/2016 | Sahin | | H04L 67/1027 |
| | | | | 709/229 |
| 2017/0085500 A1* | 3/2017 | Patney | | H04L 49/25 |

* cited by examiner

NETWORK PROCESSING UNIT (NPU) INTEGRATED LAYER 2 NETWORK DEVICE FOR LAYER 3 OFFLOADING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to network packet processing. In particular, embodiments of the present invention relate to a network processing unit (NPU) integrated layer 2 network device configured to enable layer 3 offloading.

Description of the Related Art

A network or protocol stack is a set of network protocol layers that work together to allow data to be exchanged through a communications network. An implementation of a network stack resides in each client and server and portions of the network stack are implemented in intervening traversing devices (e.g., switches, routers, gateways and network security appliances). One of the widely used conceptual models that characterizes and standardizes the networking functionality provided at various layers is the Open System Interconnection (OSI) model. The OSI model partitions a communication system into seven abstraction layers, including a physical layer (layer 1), a data link layer (layer 2), a network layer (layer 3), a transport layer (layer 4), a session layer (layer 5), a presentation layer (layer 6) and an application layer (layer 7). Each layer of the OSI model builds on the functionality of the layer immediately beneath it, if one exists. Thus, each layer effectively provides a level of abstraction, whereby different implementations of each layer within a particular network stack implementation may be interchanged so long as the interfaces between the layers remain compatible.

A typical network layer device, which may also be referred to interchangeably as a layer 3 device, includes addressing, routing and traffic control functionality for moving packets from one network node to another. Network firewalls, routers and other network security devices generally operate at layer 3 of the network stack. These layer 3 devices receive packets from devices operating at the underlying data link layer, which may be referred to as layer 2 devices (e.g., switches), or from other layer 3 devices and inspect received packets to perform routing and traffic control based on policy rules.

As layer 3 devices continue to process ever increasing amounts of network traffic, there is a potential to overburden such devices and hence reduce overall traffic throughput. In order to maintain traffic speeds, mid-range and high-end layer 3 devices, such as the FORTIGATE family of hardware-accelerated network security devices, now include one or more Application Specific Integrated Circuit (ASIC)-based network processors (NPs) to, among other things, accelerate traffic by offloading communication sessions from the central processing unit (CPU). Offloading reduces the number of packets required to be processed by the operating system kernel of the layer 3 device, however, the NPs in one layer 3 device cannot be used to offload sessions from another virtual or physical layer 3 device.

Figure 1:
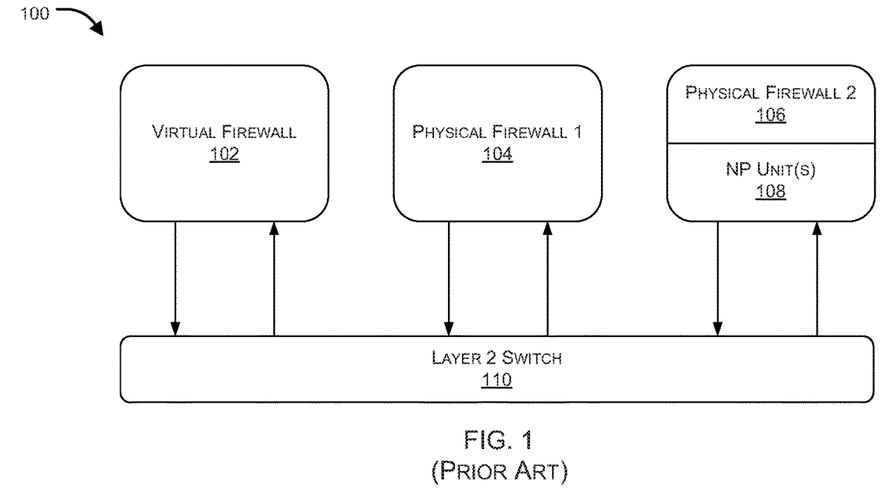
FIG. 1 illustrates an exemplary prior art network architecture in which layer 3 offloading can only be performed within a physical firewall having one or more integrated network processing units (NPUs).

FIG. 1 illustrates an exemplary prior art network architecture in which layer 3 offloading can only be performed within a physical firewall having one or more integrated network processing units (NPUs). As illustrated, a virtual firewall 102, a physical firewall 1 104 and a physical firewall 2 106 are connected to a layer 2 switch 110, wherein physical firewall 2 106 includes multiple network processing units (NPUs) 108. As mentioned above, NPUs 108 within physical firewall 2 106 are incapable of offloading sessions from virtual firewall 102 or physical firewall 1 104, which leads to above-mentioned performance, operational, and commercial limitations.

Therefore, there exists a need for systems and methods to enable new traffic flow infrastructure, such as a layer 3 offloading switch that can provide layer 3 offloading functionality to lower performance virtual and/or physical network devices, for example, that lack such internal capabilities.

SUMMARY

Systems and methods are described for facilitating offloading of communication sessions from layer 3 network devices. According to one embodiment, session information pertaining to a session capable of being offloaded is received from a layer 3 network device by a layer 2 network device that includes multiple network processing units (NPUs). The session is assigned to one of the NPUs. Subsequently, responsive to receiving, by the layer 2 network device, a packet associated with the session, the packet is processed by the assigned NPU and forwarded on behalf of the layer 3 network device to a destination specified by the processed packet.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for facilitating offloading of communication sessions from layer 3 network devices. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Systems and methods are described for facilitating offloading of communication sessions from layer 3 network devices. In an aspect, a layer 2 network device that includes a set of network processing units (NPUs) is configured to facilitate layer 3 offloading. The proposed layer 2 network device further includes a non-transitory storage device including therein one or more routines operable to facilitate forwarding of network traffic that is offloaded by a layer 3 network device that is coupled to the layer 2 network device, and a central processing unit (CPU) coupled to the non-transitory storage device and operable to execute the one or more routines.

In an aspect, the routines include a session information processing module, which when executed by the CPU of the layer 2 network device, receives session information offloaded by the layer 3 network device to the layer 2 network device, assigns the session information to one of the NPUs and maintains information regarding sessions assigned to each of the NPUs. Further, the routines include a packet processing module, which when executed by the CPU, receives a packet from the layer 3 network device, identifies a session with which the packet is associated, determines an NPU by which the packet should be processed based on the identified session and causes the identified NPU to process the packet.

In an exemplary implementation, processing of the packet includes one or more of header parsing, pattern matching, bit-field manipulation, table look-ups, packet modification, and data movement.

In an aspect, the routines can include a packet forwarding module, which when executed by the CPU, forwards the processed packet towards a destination specified by the processed packet on behalf of the layer 3 network device.

In an aspect, the layer 2 network device can be a switch, and the layer 3 network device can be a physical firewall, a virtual firewall, a physical router, a virtual router, a physical gateway device, a virtual gateway device, a physical network controller or a virtual network controller.

In an aspect, a session information processing module can be configured to create, delete, update or maintain a session table in order to maintain updated session information and mapping of sessions on different NPUs.

In another aspect, a method for facilitating layer 3 offloading by a layer 2 network device is described. In an exemplary implementation, a layer 2 network device that includes a set of NPUs for facilitating layer 3 offloading can be configured to perform the steps of receiving session information pertaining to a session capable of being offloaded from a layer 3 network device, and assigning the session to an NPU of the set of NPUs of the layer 2 network device. The method executed by the layer 2 network device can further include the steps of receiving a packet associated with the session, and in response to receipt of the packet, causing the packet to be processed by the NPU responsible for the associated session, and forwarding the processed packet on behalf of the layer 3 network device towards a destination specified by the processed packet. In an exemplary implementation, the layer 2 network device can receive the session information from a layer 3 network device.

The layer 2 network device may be in the form of a switch or other suitable network element. Similarly the layer 3 network devices may be in the form of a virtual or physical firewall, a virtual or physical router, a virtual or physical gateway, a virtual or physical network controller or other suitable network element.

In an embodiment, a session table maintaining session information can include several fields, for example a unique session identifier, an action to be taken, a session expiration time, details of subsequent task, next task details, and the like, which can also be maintained by the layer 2 network device.

In an embodiment, a daemon running within the layer 2 network device creates, deletes, maintains or updates the session information.

Terminology

Brief definitions of terms used throughout this application are given below.

If the specification states a component or feature "may", "can", "could", or "might" be included or have a characteristic, that particular component or feature is not required to be included or have the characteristic.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

Figure 2:
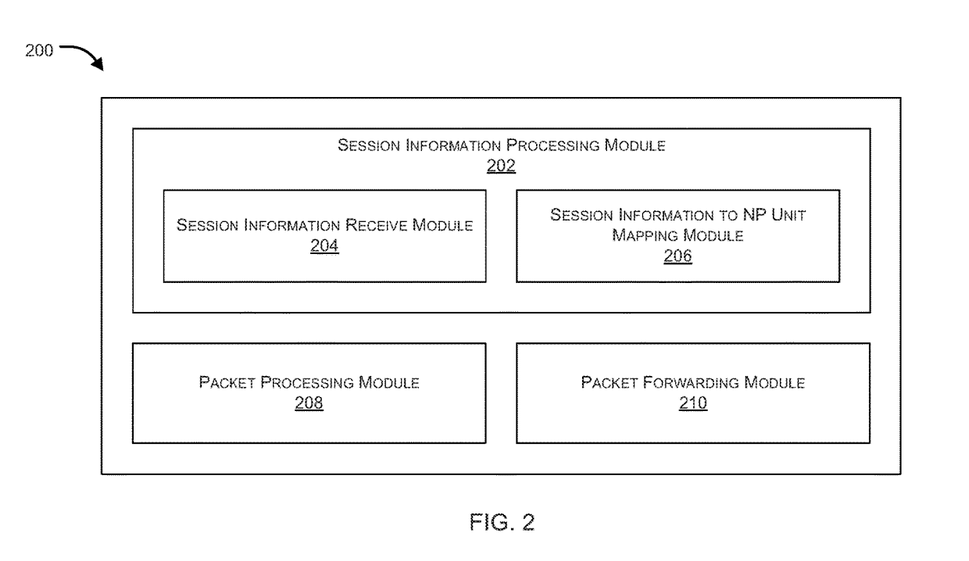
FIG. 2 illustrates exemplary functional modules of a layer 2 network device that can perform layer 3 offloading on behalf of a variety of layer 3 network devices in accordance with an embodiment of the present invention.

FIG. 2 illustrates exemplary functional modules of a layer 2 network device 200 that can perform layer 3 offloading on behalf of a variety of layer 3 network devices in accordance with an embodiment of the present invention. In the context of the present example, layer 2 network device 200 includes a session information processing module 202 for receiving session information offloaded by a layer 3 network device and maintaining a mapping of sessions to corresponding NPUs. In an exemplary implementation, session information processing module 202 can include a session information receive module 204 that can be configured to receive session information offloaded by a layer 3 device, and a session information to NP unit mapping module 206 configured to associate an offloaded session with an NPU and maintain a mapping of sessions to NPUs to which they are assigned. In an exemplary implementation, layer 2 network device 200 can be configured to receive session information and offloading request from any number of layer 3 network devices on behalf of which the layer 2 network device is configured to perform layer 3 offloading.

As those skilled in the art will appreciate, the layer 3 devices served by layer 2 network device 200 can be in virtual or physical form and include, but are not limited to firewalls, routers, gateways, network controllers, layer 3 network appliances and/or security devices or combinations thereof. As such, those skilled in the art will appreciate although various embodiments of the present invention may be described in the context of offloading requests being received from a particular type of layer 3 device, such as a firewall, depending upon the particular implementation layer 2 network device 200 may serve other types of layer 3 devices and homogeneous or heterogeneous groups thereof.

In an aspect, the session information to network processing unit (NPU) mapping module 206 can be configured to assign session information to one or more NPUs, and maintain information pertaining to the sessions assigned to the one or more NPUs. In an exemplary implementation, a CPU (not shown) of the layer 2 device can perform load balancing while associating a session with a particular NPU.

Layer 2 network device 200 can further include a packet processing module 208 configured to receive a packet from a layer 3 network device, identify a session with which the received packet is associated, determine the NPU by which the packet should be processed based on the identified session and cause the identified NPU to process the packet. In an exemplary implementation, processing of the packet can include, but is not limited to, header parsing, pattern matching, bit-field manipulation, table look-ups, packet modification and data movement.

In another aspect, layer 2 network device 200 can include a packet forwarding module 208 configured to forward the processed packet towards or to a destination specified by/in the processed packet on behalf of the layer 3 network device.

Those skilled in the art will appreciate that although embodiments of the present invention are described with reference to layer 2 device 200 in the form of a switch, layer 2 device 200 may take other forms depending upon the particular implementation. As such, it is to be appreciated that layer 2 network device 200 in the form of a switch as illustrated in FIG. 2 is therefore completely exemplary in nature.

In an aspect, layer 2 network device 200 enables NPUs to work independent of each other. Layer 2 network device 200 can facilitate layer 3 offloading for any physical or virtual layer 3 network appliance/device of any vendor that is configured to request such offloading. In an exemplary implementation, layer 2 network device 200 can share a session mapping table with other layer 3 device(s) so as to enable efficient forwarding. As one may appreciate, layer 2 network device 200 can forward layer 3 traffic directly. In an exemplary implementation, one or more layer 3 network devices can be aware of the IP address of layer 2 network device 200 for forwarding session information and performing layer 3 offloading on their behalf. In an aspect, a connection between the one or more layer 3 network devices and the proposed layer 2 network device can be pre-established.

In an exemplary implementation, a layer 3 network device, upon receiving a first packet of a communication session, can determine if subsequent packets of the session are capable of being offloaded to layer 2 network device 200. Offloading logic can be implemented within the layer 3 network device so as to enable a determination of when to use layer 2 network device 200 for performing layer 3 offloading. In an exemplary implementation, the layer 3 network device, upon making an affirmative determination that the session can be offloaded to layer 2 network device 200, can send session information to layer 2 network device 200 through the pre-setup connection. For instance, in a sample session, a first packet (for UDP) or the first three packets (for TCP) can be processed by the layer 3 device, after which the layer 3 network device can decide whether to offload the session upon receipt of subsequent packets. If the layer 3 network device determines that the session is offloadable, it can send the session information (e.g., information regarding one or more of the protocol, the source IP address, the destination IP address, the source media access control (MAC) address, the destination MAC address, the source port, the destination port, connection state information, a unique session identifier, an action to be taken, a session expiration time, details of subsequent task and next task details), to the layer 2 network device through the pre-setup connection via a daemon running on both sides of the connection.

Responsive to receiving the session information from the layer 3 network device, layer 2 network device 200 can associate the session with an NPU so as to manage/process subsequent packets associated with the session. Layer 2 network device 200 can install/configure the session information within an NPU. On receiving a subsequent packet relating to the session, layer 2 network device 200 can identify the session and the session information associated with the received packet to determine whether the session is available on layer 2 network device 200, and if a match is found, layer 2 network device 200 can determine the NPU responsible for handling the session with which the received packet is associated, based on which the determined NPU can perform the offloading on behalf of the layer 3 network device.

In an exemplary implementation, a session maintenance protocol, implemented by daemons on both ends of the connection, can be used between layer 2 network device 200 and the layer 3 network devices for transmitting and receiving session information.

In an exemplary implementation, layer 3 network device can use a session maintain daemon (Session_maintain_daemon_fw) for sending session information to layer 2 network device 200. When a layer 3 network device, for example a firewall, determines a particular session can be offloaded (e.g., there is no need for proxy processing of the session, etc.), instead of processing the session by its CPU, the layer 3 network device can direct the session maintain daemon to push the session to its registered layer 2 network device (which may also be referred to interchangeably to as a "Layer 3 offloading switch"). The session maintain daemon can be used for communicating information to the layer 3 offloading switch regarding session modification and termination. The session maintain daemon can be used for sending/receiving session maintenance information to/from the layer 3 offloading switch.

In an exemplary implementation, layer 2 network device 200 can rely on a TCP connection between the layer 3 network device and the layer 2 network device, instead of relying on PCIe, which would typically be used to offload sessions to NPUs within a high-performance layer 3 network device having integrated NPUs.

In an exemplary implementation, the layer 3 offloading switch can be placed in a network where most of the traffic could be forwarded directly, and does not have to be directly connected to the layer 3 devices. As one may appreciate, a single layer 2 network device 200 can serve several layer 3 network devices.

In an exemplary implementation, layer 2 network device 200 can use a second session maintain daemon (session_maintain_daemon_sw) that can be configured to receive or send session maintenance information from/to layer 3 network devices.

Figure 3:
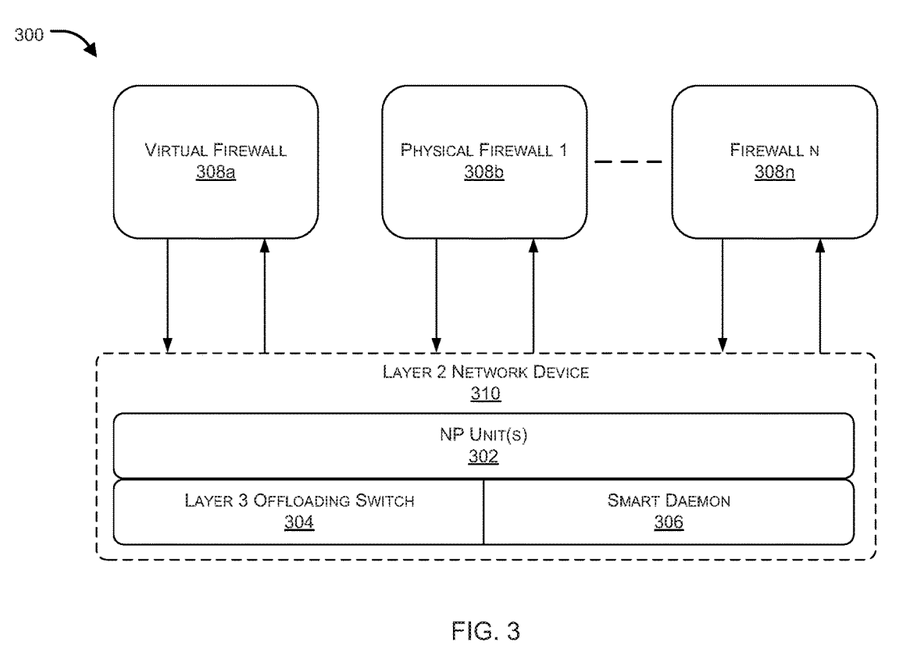
FIG. 3 is an exemplary network architecture of a layer 2 network device capable of performing high performance layer 3 forwarding on behalf of other layer 3 network devices in accordance with an embodiment of the present invention.

FIG. 3 is an exemplary network architecture of a layer 2 network device 310 capable of performing high performance layer 3 forwarding on behalf of other layer 3 network devices 308*a-n* in accordance with an embodiment of the present invention. As illustrated, a virtual firewall 308*a*, a physical firewall 308*b* and a firewall 308*n* (collectively referred to as layer 3 network devices 308) can coupled in communication with layer 2 network device 310 through suitable communication connections, which can be pre-established or established on demand. In an exemplary implementation, layer 2 network device 310 can include one or more network processing units (NPUs) 302 for processing packets, a layer 3 offloading switch 304 for performing layer 3 offloading, and a smart daemon 306 for receiving and maintaining session information. When a session offloading determination is made by any of layer 3 network devices 308, session information from the respective layer 3 network device can be transmitted to smart daemon 306 of layer 2 network device 310. In an exemplary implementation, upon receiving the offloaded session information, layer 2 network device 310 can associate the session with a particular NPU selected from one or more NPUs 302 for processing subsequent packets associated with that session.

In an embodiment, a session table (not shown) can be maintained, wherein the session table can include session information, including but not limited to, information regarding one or more of the protocol, the source IP address, the destination IP address, the source MAC address, the destination MAC address, the source port, the destination port, connection state information, a unique session identifier, an action to be taken, a session expiration time, details of subsequent task and next task details and the like for processing the subsequent packets of the session by layer 2 network device 310.

In an embodiment, after assignment of the offloaded session information, daemon 306 can create, delete, maintain or update session information, wherein session information can also be further transmitted to one or more layer 3 network devices 308. In an alternate embodiment, session information can also be transmitted to any other operatively coupled device.

In an embodiment, daemon 306 can periodically check completion of the session with the originating layer 3 network device or layer 2 network device can be informed of termination of the session by the originating layer 3 network device.

In another embodiment, one or more daemons can receive and send information from the layer 3 devices in an asynchronous manner. In an alternate embodiment, information can be sent/received by one or more daemons in a synchronous manner.

In another embodiment, information exchanged between layer 3 device 308 and layer 2 device 310 can be carried over a suitable network protocol, wherein both the devices can include similar types of daemons for such information exchange.

Figure 4:
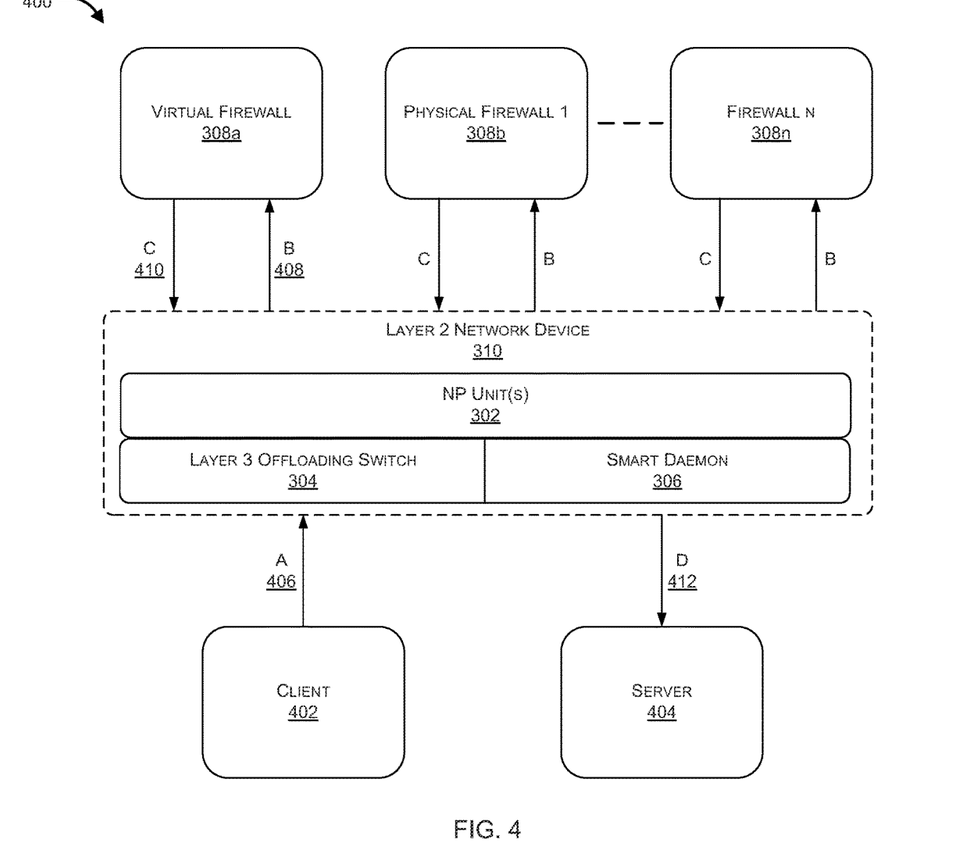
FIG. 4 illustrates exemplary data flow among a layer 2 network device capable of performing high performance layer 3 forwarding and layer 3 network devices in accordance with an embodiment of the present invention.

FIG. 4 illustrates exemplary data flow among a layer 2 network device 310 capable of performing high performance layer 3 forwarding and layer 3 network devices 308a-n in accordance with an embodiment of the present invention. As illustrated, typical processing of packets by layer 2 network device 310 and layer 3 network device 308a-n includes step A 406 of receiving a packet from a client 402 at layer 2 network device 310, step B 408 of forwarding the packet to a layer 3 network device (for example, virtual firewall 308a), step C 410 of receiving the processed packet at layer 2 network device 310 from the layer 3 network device, and step D 412 of forwarding the processed packet to server 404.

In one embodiment, existing network devices follow the same traffic flow for all subsequent packets even if the packets relate to a given communication session. Embodiments described herein provide a layer 2 network device 310 that can perform layer 3 offloading for subsequent packets related to a session where layer 2 network device 310 gets session information from layer 3 network device 308 and processes all packets relating to the session through one of its NPU to which the session is assigned. In an exemplary implementation, upon receiving a first packet (step A 406) for a communication session for the first time from a client 402, layer 2 network device 310 can forward (step B 408) the first packet to be processed by appropriate layer 3 network device, for example a virtual firewall 308a, physical firewall 1 308b, or a firewall N 308n. Layer 3 network device 308, after processing the first packet, can determine if the session is offloadable and if the determination is affirmative (e.g., no proxy processing is required for the session), layer 3 network device 308 can send (step C 410) session information to layer 2 network device 310. Subsequent packets can then be processed by layer 2 network device 310 itself (without further processing by layer 3 network device 308), and can be directly forwarded to server 404 (step D 412). As one may appreciate, in such a case, the path followed by subsequent packets of an existing offloaded session would be A→D, instead of A→B→C→D.

Although not being limited, in one exemplary implementation, client and server can use same or different network protocols, including Hypertext Transfer Protocol (HTTP), Transmission Control Protocol (TCP) and the Internet Protocol (IP), among other protocols that are well known to people ordinarily skilled in the art.

Those skilled in the art will appreciate that although the above example has been described with a client and a server as a packet originator and a packet recipient, respectively, other network elements may be the source and destination of packets processed by layer 2 network device 310.

Figure 5:
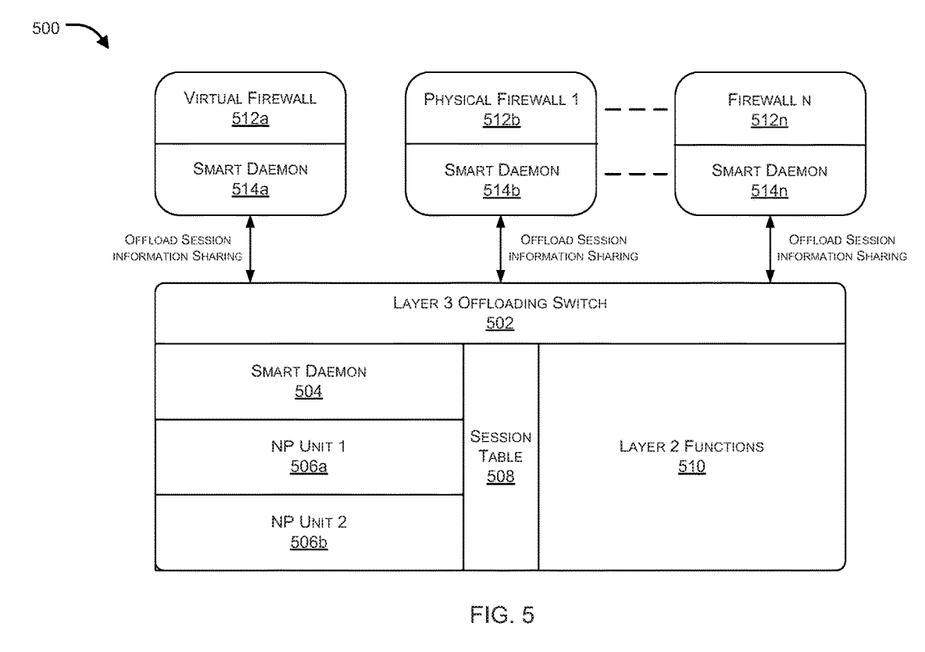
FIG. 5 is a more detailed block diagram illustrating interactions among a layer 2 network device capable of performing high performance layer 3 forwarding and layer 3 network devices in accordance with an embodiment of the present invention.

FIG. 5 is a more detailed block diagram illustrating interactions among a layer 2 network device 502 capable of performing high performance layer 3 forwarding and layer 3 network devices 512a-n in accordance with an embodiment of the present invention. As illustrated, layer 3 offloading switch 502 (which may also be interchangeably referred to as layer 2 network device) can include a smart daemon 504, one or more network processing units, for example NPU 506a and NPU 506b, and a memory unit (not shown) for storing a session table 508. In an exemplary implementation, layer 3 offloading switch 502 can also perform layer 2 functions represented as 510. In an exemplary implementation, layer 3 offloading switch 502 can be configured to perform layer 3 offloading on behalf of layer 3 network devices 512a-n, for example virtual firewall 512a, physical firewall 1 512b, and firewall N 512n. In an exemplary implementation, each layer 3 network device can include a daemon, for example daemon 514a for virtual firewall 512a, daemon 514b for physical firewall 1 512b, and daemon 514n for firewall N 512n, for sharing session information.

In an embodiment, offloaded session information can be exchanged between one or more layer 3 offloading switches such as 502 and one or a combination of layer 3 network devices 512. Such information exchange is performed via communication between smart daemon 504 and one or more daemons 514a, 514b and 514n. In an exemplary embodiment, layer 3 network devices 512 are connected to the layer 3 offloading switch 502 such that when a determination is made to offload a session from a particular layer 3 network device to the switch 502, an offloading request is issued from the daemon of the respective layer 3 network device to the smart daemon 504.

In an embodiment, a session table can also be maintained so as to include the offloaded session information, including but not limited to, information indicative of information regarding one or more of the protocol, the source IP address, the destination IP address, the source MAC address, the destination MAC address, the source port, the destination port, connection state information, a unique session identifier, an action to be taken, a session expiration time, details of subsequent task and next task details and other like session attributes/parameters.

In an embodiment, after the offloaded session has been assigned to an NPU 506a or 506b, daemon 504 can create, delete, maintain, or update session information, wherein the session information can also be transmitted from the layer 3 offloading switch 502 to the one or more layer 3 network devices 512a-n. In an alternate embodiment, session information can be transmitted to any other operatively coupled device.

Figure 6:
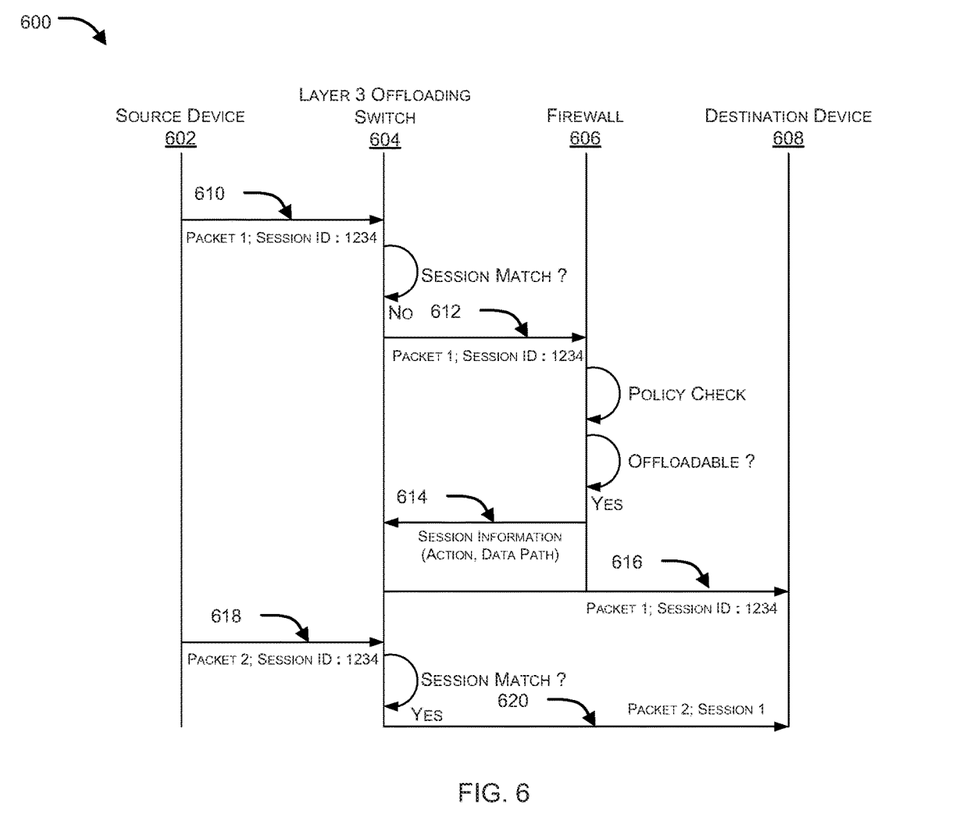
FIG. 6 is a sequence diagram illustrating exemplary packet flow in a network having a layer 3 offloading switch in accordance with an embodiment of the present invention.

FIG. 6 is a sequence diagram illustrating an exemplary packet flow in a network having a layer 3 offloading switch 604 in accordance with an embodiment of the present invention. As illustrated, a source device 602 can transmit, at step 610, session information e.g. session ID: 1234 associated with a packet 1 to layer 3 offloading switch 604, based on which layer 3 offloading switch 604 can attempt to find a match for the session information. If a match is not found, switch 604, at step 612, can forward the packet to a firewall 606 for processing (e.g., policy checking and a determination regarding whether the session is to be offloaded). Further, at step 614, firewall 606 can share, among other session information for offloading, for example, an action for offloading, data path, etc, with layer 3 offloading switch 604 for processing packet 1 and/or subsequent packets associated with the offloaded session. At step 616, layer 3 offloading switch 604 can process packet 1 and forward the processed packet to destination device 608 on behalf of firewall 606. Further, at step 618, source device 602 can transmit a subsequent packet (i.e., packet 2) associated with the same session information (i.e., session ID: 1234) to layer 3 offloading switch 604, and if switch 604 finds a match for the session, switch 604, at step 620, can process the packet and can transmit the processed packet to destination device 608 without further involvement by firewall 606.

Figure 7:
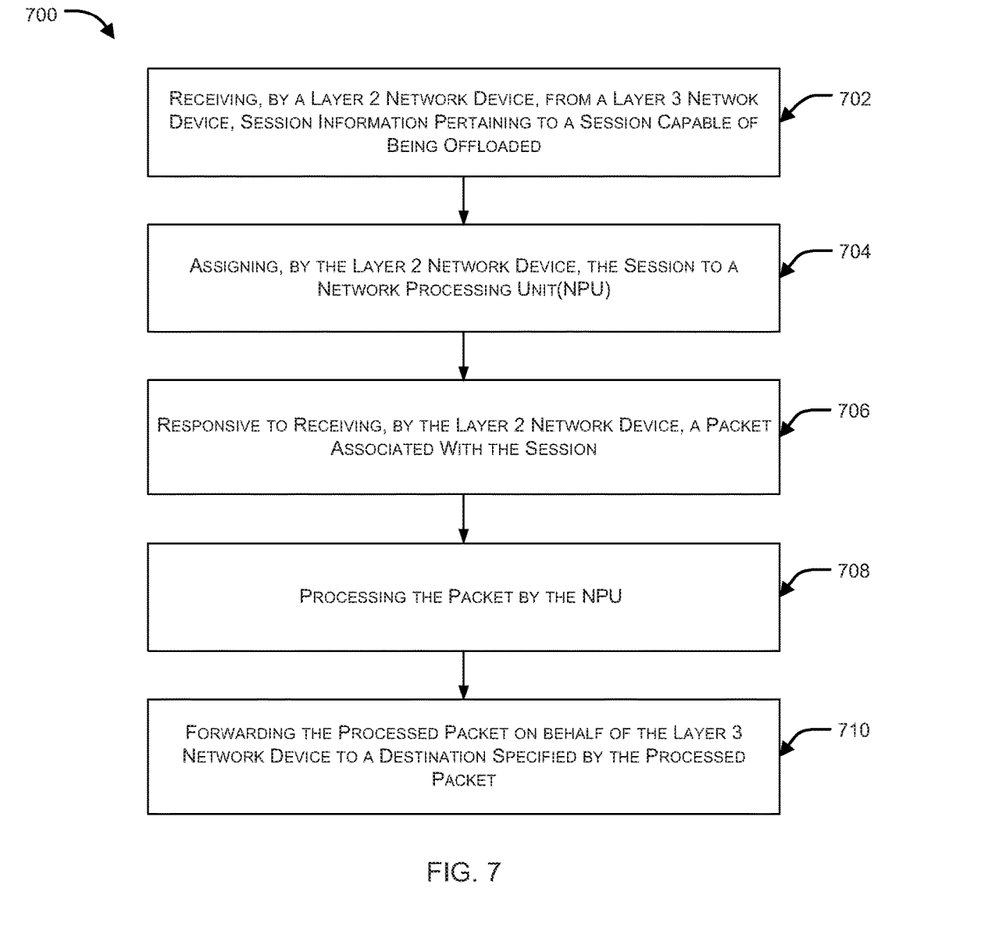
FIG. 7 is a flow diagram illustrating layer 3 offloading processing in accordance with an embodiment of the present invention.

FIG. 7 is a flow diagram 700 illustrating layer 3 offloading processing in accordance with an embodiment of the present invention. In the context of the present example, layer 3 offloading processing includes the steps of, at step 702, receiving, by a layer 2 network device that includes multiple network processing units (NPUs), from a layer 3 network device, session information pertaining to a session capable of being offloaded; and at step 704, assigning, by the layer 2 network device, the session to an available NPU of the multiple of NPUs (by any suitable assignment mechanism, e.g., load balancing or scheduling). The method can further include the step of, at step 706, receiving, by the layer 2 network device, a packet associated with the session, and at step 708, processing the packet by the assigned NPU. The method can further include the step of, at step 710, forwarding the processed packet on behalf of the layer 3 network device to a destination specified by the processed packet.

Figure 8:
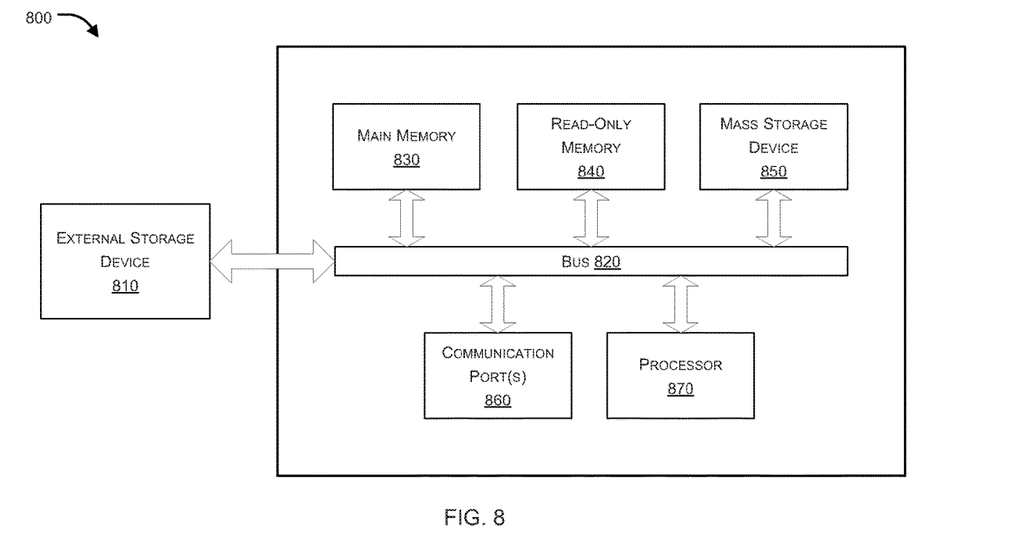
FIG. 8 is an exemplary computer system in which or with which embodiments of the present invention may be utilized.

FIG. 8 is an exemplary computer system in which or with which embodiments of the present invention may be utilized. In an embodiment, the computer system 800 may represent a layer 2 network device (e.g., layer 2 network device 310, layer 3 offloading switch 502 or layer 3 offloading switch 604) and performs layer 3 offloading on behalf of one or more layer 3 network devices. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown in the figure, computer system 800 includes an external storage device 810, a bus 820, a main memory 830, a read only memory 840, a mass storage device 850, communication port 860, and a processor 870. A person skilled in the art will appreciate that computer system 800 may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system 800 connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system 800. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A layer 2 network device comprising:
   a plurality of network processing units (NPUs);
   a non-transitory storage device having embodied therein one or more routines operable to facilitate forwarding of network traffic offloaded by a layer 3 network device coupled to the layer 2 network device; and
   a central processing unit (CPU) coupled to the non-transitory storage device and operable to execute the one or more routines, wherein the one or more routines include:
   a session information processing module, which when executed by the CPU, receives session information associated with a session offloaded by the layer 3 network device, assigns the session information to one of the plurality of NPUs and maintains information regarding sessions assigned to each of the plurality of NPUs;
a packet processing module, which when executed by the CPU, receives a packet, identifies the packet as being associated with the session, determines the associated NPU of the plurality of NPUs by which the packet should be processed based on the session and causes the associated NPU to process the packet, including one or more of header parsing, pattern matching, bit-field manipulation, table look-ups, packet modification and data movement; and
a packet forwarding module, which when executed by the CPU, forwards the processed packet to a destination specified by the processed packet on behalf of the layer 3 network device.

2. The layer 2 network device of claim 1, wherein the layer 2 network device comprises a switch.

3. The layer 2 network device of claim 1, wherein the layer 3 network device comprises any or a combination of a physical firewall, a virtual firewall, a physical router, a virtual router, a physical gateway device, a virtual gateway device, a physical network controller and a virtual network controller.

4. The layer 2 network device of claim 1, wherein the session information processing module is configured to create, delete, update or maintain a session table.

5. A method comprising:
receiving, by a layer 2 network device including a plurality of network processing units (NPUs), from a layer 3 network device, session information pertaining to a session capable of being offloaded;
assigning, by the layer 2 network device, the session to a first NPU of the plurality of NPUs;
responsive to receiving, by the layer 2 network device, a packet associated with the session:
  causing the packet to be processed by the first NPU; and
  forwarding the processed packet on behalf of the layer 3 network device to a destination specified by the processed packet.

6. The method of claim 5, wherein the layer 2 network device comprises a switch.

7. The method of claim 5, wherein the layer 3 network device comprises any or a combination of a physical firewall, a virtual firewall, a physical router, a virtual router, a physical gateway device, a virtual gateway device, a physical network controller, and a virtual network controller.

8. A method comprising:
offloading, by a layer 2 network device including a plurality of network processing units (NPUs), a plurality of sessions from a layer 3 network device by:
  receiving, by the layer 2 network device, session information pertaining to each of the plurality of sessions from the layer 3 network device;
  assigning, by the layer 2 network device, each of the plurality of sessions to respective NPUs of the plurality of NPUs;
  responsive to receiving, by the layer 2 network device, a packet:
    determining whether the packet is associated with a session of the plurality of sessions by comparing the packet against the session information;
    when said determining is negative, forwarding the packet to the layer 3 network device for processing; and
    when said determining is affirmative:
      processing the packet by an NPU of the plurality of NPUs to which the session has been assigned; and
      forwarding the processed packet on behalf of the layer 3 network device to a destination specified by the processed packet.

9. The method of claim 8, wherein said receiving, by the layer 2 network device, session information pertaining to each of the plurality of sessions from the layer 3 network device comprises receiving, by a session maintenance daemon running on the layer 2 network device, the session information.

10. The method of claim 8, wherein said assigning, by the layer 2 network device, each of the plurality of sessions to respective NPUs of the plurality of NPUs includes maintaining a mapping between each of the plurality of sessions and the respective NPUs via a session table.

11. The method of claim 8, wherein said assigning, by the layer 2 network device, each of the plurality of sessions to respective NPUs of the plurality of NPUs includes performing load balancing among the plurality of NPUs.

12. The method of claim 8, wherein the session information comprises for each session of the plurality of sessions information regarding one or more of the protocol associated with the session, a source Internet Protocol (IP) address, a destination IP address, a source Media Access Control (MAC) address, a destination MAC address, a source port, a destination port, connection state information, a unique session identifier, an action to be taken on packets associated with the session and a session expiration time.

13. The method of claim 8, wherein said processing the packet by an NPU of the plurality of NPUs to which the session has been assigned includes performing one or more of header parsing, pattern matching, bit-field manipulation, table look-ups, packet modification and data movement.

* * * * *